Sept. 7, 1937.  L. RICEFIELD  2,092,704
COUPLING
Filed May 21, 1936  2 Sheets-Sheet 1
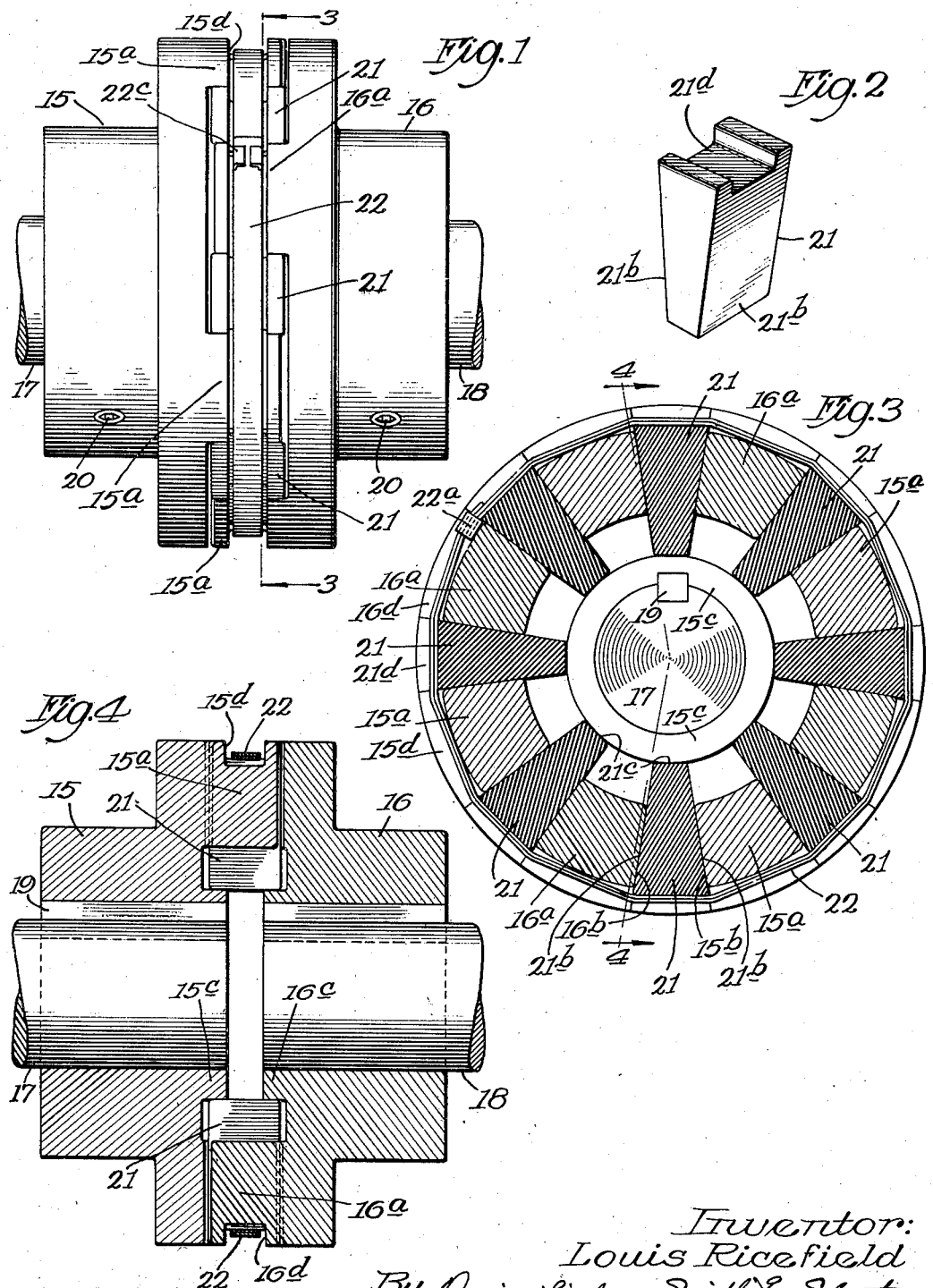
Inventor:
Louis Ricefield
By Davis, Lindsey, Smith & Shonts,
Attys.

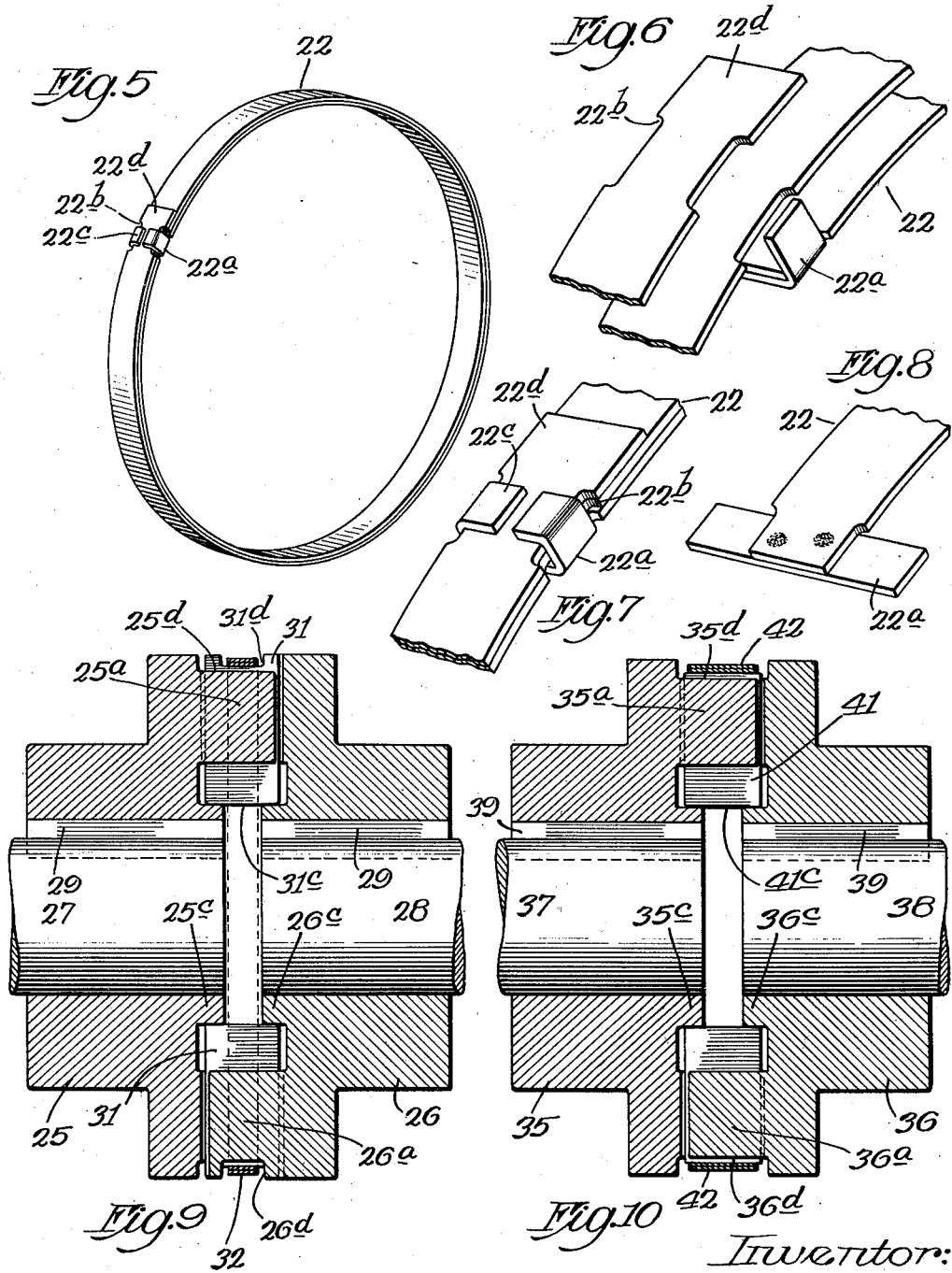

Patented Sept. 7, 1937

2,092,704

UNITED STATES PATENT OFFICE 2,092,704

COUPLING

Louis Ricefield, Oak Park, Ill.

Application May 21, 1936, Serial No. 80,940

6 Claims. (Cl. 64—14)

This invention relates to improvements in couplings adapted for use in connecting substantially aligned shafts and its purpose is to provide an improved device adapted to compensate for angular misalignment, relative lateral displacement and relative endwise movement of the shafts during their rotation. The present invention is an improvement upon the types of couplings disclosed in my United States Patents No. 1,748,146, dated February 25, 1930, and No. 2,025,827, dated December 31, 1935, wherein two coupling members, each secured upon one of two substantially aligned shafts, are provided with longitudinally extending lugs or jaws which intermesh loosely with each other and which receive between them power transmitting members, formed preferably of resilient compressible material, through which forces are transmitted from one coupling member to the other. The principal object of the present invention is to provide an improved coupling of the type referred to comprising improved means for retaining the power transmitting members against radial outward displacement during the rotation of the shafts. A further object of the invention is to provide an improved coupling of this type comprising an annular retaining member adapted to surround the outer ends of the power transmitting members and mounted in a free floating position with respect to these members and the coupling members, with or without means for restricting movement of the retaining member longitudinally of the shafts with respect to either the power transmitting members or the coupling members. Another object is to provide an improved coupling of this type comprising a retaining member surrounding the jaws of the coupling members and the intermediate power transmitting members and made up of a continuous band of material wound in a plurality of superimposed convolutions and having the ends thereof secured together on the outer side of the coupling. Still another object of the invention is to provide an improved coupling of the type referred to in which the power transmitting members are restrained against radial inward movement by an annular member, which may be a hub of one of the coupling members, and are restrained against radial outward movement by an annular band of flat metal comprising a plurality of layers wound in spiral fashion about the coupling on the outer sides of the jaws of the coupling members and about the outer ends of the power transmitting members, the superimposed layers of the band being held against unwinding under the influences of forces acting radially outward primarily by their frictional contact with each other when the ends of the band are secured together. A further important object of the invention is to provide an improved coupling comprising a pair of coupling members having longitudinally extending intermeshing jaws adapted to receive between them a plurality of separate power transmitting members in combination with retaining means which is so constructed and mounted with respect to the other parts of the coupling that the coupling may rotate freely in a limited space while at the same time permitting access to the power transmitting members for the purpose of replacement and repair. Other objects relate to various features of construction and arrangement which will appear more fully hereinafter.

The nature of the invention will be understood from the following specification taken with the accompanying drawings, in which certain embodiments of the invention are illustrated. In the drawings, Fig. 1 shows a side elevation of one form of coupling embodying the features of the present invention;

Fig. 2 is a perspective view of one of the power transmitting members embodied in the coupling shown in Fig. 1;

Fig. 3 is a sectional view taken on the line 3—3 of Fig. 1;

Fig. 4 is a sectional view taken on the line 4—4 of Fig. 3;

Fig. 5 is a perspective view of the annular retaining member which is embodied in the coupling shown in Figs. 1 to 4, inclusive;

Fig. 6 is an enlarged perspective view of the overlapping ends and an intermediate layer of the annular retaining member before the ends of this member have been secured together;

Fig. 7 is a perspective view of the parts shown in Fig. 6 after the ends of the retaining member have been secured together by folding flanges carried by the inner end about the other layers of the band;

Fig. 8 is a perspective view of the inner end of the annular retaining member showing the flanges carried thereby before the band has been applied to the coupling;

Fig. 9 is a sectional view similar to that of Fig. 4, showing a modified form of construction in which the annular retaining band is restricted in its movement endwise of the coupling with respect to the power transmitting members and one coupling member but may have unlimited relative movement in that direction with respect to the jaws of the other coupling member; and Fig. 10 is a sectional view similar to that of Fig. 4, showing another modified form of the invention in which the annular retaining band is restricted in its movement endwise of the coupling in one direction with respect to one coupling member and in the opposite direction with respect to the other coupling member, while being unrestricted in its relative movement in either direction with respect to the power transmitting members.

The form of the invention shown in Figs. 1 to 8, inclusive, comprises a pair of metallic coupling members 15 and 16 adapted to be secured upon a pair of substantially aligned shafts 17 and 18, respectively, by means of keys 19 and set screws 20. The coupling member 15 comprises a radially extending disk having formed integrally therewith a plurality of longitudinally extending lugs or jaws 15$^a$ which are adapted to intermesh loosely with a plurality of similar lugs or jaws 16$^a$ which are formed integrally with and extend longitudinally from the disk of the other coupling member 16. These lugs or jaws 15$^a$ and 16$^a$ are adapted to receive between them a plurality of power transmitting members 21 which are preferably formed partly or wholly of resilient compressible material such as rubber, rubberized duck, leather, or combinations of these materials, the component parts of which are secured together to form a body having great wearing and abrasion-resisting qualities. Each power transmitting member is provided on its opposite sides with inwardly converging flat faces 21$^b$ which are adapted to coact with corresponding inwardly converging flat faces 15$^b$ and 16$^b$ formed on two lugs or jaws 15$^a$ and 16$^a$ carried by opposite coupling members. The opposite lug engaging faces 21$^b$ of each power transmitting member may be parallel to each other or they may be otherwise formed, but they preferably converge inwardly in such a manner as to bring about a substantially uniform wear upon all parts of each power transmitting member which are subjected to compressive stresses during the transmission of power from one coupling member to the other, as explained in my Patent No. 2,025,827, above referred to. The inner ends 21$^c$ of the power transmitting members 21 are adapted to contact with and be restrained against inward movement by the hub portions 15$^c$ and 16$^c$ of the coupling members which project beyond the inner faces of the radial disks of the coupling members inwardly from the inner margins of the intermeshing lugs or jaws 15$^a$ and 16$^a$.

The power transmitting members 21 are restrained against radial outward movement, except to the limited extent which is necessary to permit compensation for misalignment of the shafts, by an annular retaining member 22 which is in the form of a flat metal band of steel or the like wound upon itself to form the several convolutions of a spiral. This band is cut to the proper length for the size of the coupling for which it is intended and, after it has been wrapped around the coupling in the manner shown in Fig. 3, the overlapping ends of the band are secured together by means of flanges 22$^a$ which are welded or otherwise secured to the inner end of the band and which initially have the form shown in Fig. 8. These flanges may be bent outwardly, as shown in Fig. 6, to form a channel and the lateral edges of the band are provided at intervals with notches 22$^b$ which are adapted to align with each other when the band has been wrapped to the proper degree of tautness about the coupling, as shown in Fig. 7. The ends of the flanges are then bent inwardly as shown at 22$^c$ to overlie the outer end portion 22$^d$ of the band which then has the form of an annular inextensible retaining member surrounding the outer ends of the power transmitting members 21 and the outer faces of the jaws 15$^a$ and 16$^a$. Any tendency of the band 22 to expand circumferentially due to radial outward pressure on the inner layer thereof is opposed by the extensive frictional resistance between adjacent convolutions so that there is ordinarily no appreciable strain upon the flanges 22$^a$ which serve to hold the outer end 22$^d$ in its proper position engaging the next inner convolution, and the band has substantially the same strength as a solid band of the same cross-sectional dimensions. In case there is any slippage of the convolutions of the band upon each other, it is necessary to shear off the flanges 22$^a$ in order to release the retaining member and that would require a very substantial strain. The band 22 is formed of steel having some resiliency and it has an initial tendency to assume the spiral form before being wrapped around the coupling, but this resiliency has no function after the band assumes the final shape shown in Figs. 3 and 5 because the band is then inextensible. It may be very conveniently applied to the other parts of the coupling after the power transmitting members have been put in place between the jaws and may be as readily removed in the event that it is necessary to replace any one of the power transmitting members.

In the form of the invention shown in Figs. 1 to 4, inclusive, the power transmitting members 21 are provided with rectangular notches 21$^d$ in their outer ends to receive the retaining member 22 and in this form of construction the outer ends of the jaws 15$^a$ and 16$^a$ are provided with similar rectangular notches 15$^d$ and 16$^d$ to receive the band 22. These notches 15$^d$, 16$^d$ and 21$^d$ are preferably of greater width than the band which forms the retaining member 22 so that some relative movement of the band with respect to the power transmitting members and with respect to the jaws of the coupling members is permitted longitudinally of the coupling to accommodate relative endwise movement of the shafts 17 and 18 and misalignment of these shafts. When these notches are provided, the annular retaining member 22, after being applied to the coupling, occupies a position wholly within the outer peripheral surfaces of the disks on which the jaws 15$^a$ and 16$^a$ are formed, as shown in Fig. 4, so that there is no danger of contact of the flanges 22$^a$ or any other part of the rotating retaining member 22 with surrounding objects during the rotation of the coupling. When the band 22 has been wrapped around the power transmitting members and the jaws in engagement with the notches in these members, it may be flattened out in engagement with the bottoms of the grooves or notches, as shown in Fig. 3, to form in effect the several sides of a polygon, particularly when the material of the band 22 is formed of relatively thin material. The notches 15$^d$ and 16$^d$ are preferably of such depth that the bottoms of these notches are not engaged by the annular retaining member 22 which then rests entirely upon the bottoms of the notches in the outer ends of the power transmitting members 21, thereby permitting some relative outward movement of the jaws with respect to the band 22 which may be desirable in compensating for misalignment of the shafts.

In Fig. 9, there is shown a modified form of the invention in which the jaws of one coupling member are not provided with notches for engagement by the annular retaining member so that this coupling member is capable of an unlimited longitudinal movement with respect to the power transmitting members and the other coupling member. In this form, a pair of coupling members 25 and 26 are secured upon a pair of substantially aligned shafts 27 and 28 by means of keys 29 and set screws, not illustrated. The coupling member 25 is provided with a plurality of longitudinally extending lugs or jaws 25ª which are adapted to intermesh loosely with lugs or jaws 26ª which are formed integrally with and extend longitudinally from the other coupling member 26. As in the form of the invention previously described, these lugs or jaws 25ª and 26ª are adapted to receive between them a plurality of power transmitting members 31 which may be formed of rubber, leather, rubberized fabric, or combinations of any of these materials, to form resilient compressible bodies through which forces are transmitted from one coupling member to the other. The opposite lug-engaging faces of each power transmitting member 31 may converge inwardly, as shown in Fig. 1, or may have such other configurations as may be desirable, and the inner ends 31ᶜ of these members are adapted to engage the projecting hub portions 25ᶜ and 26ᶜ of the coupling members. The jaws 26ª are provided at their outer ends with notches 26ᵈ to receive the annular retaining member 32 which is formed by several convolutions of a flat band of metal in the manner shown in Fig. 5, and the outer ends of the power transmitting members are similarly provided with rectangular notches 31ᵈ to receive this retaining member. The outer end faces 25ᵈ of the jaws 25 are unnotched and these surfaces, as well as the surfaces forming the bottoms of the notches 26ᵈ, are spaced inwardly from the retaining member 32 which is thus supported entirely by its engagement with the notches in the outer ends of the power transmitting members 31. With this arrangement, some movement of both coupling members 25 and 26 is permitted in a radial direction with respect to the retaining member 32 when the power transmitting members 31 are compressed or distorted in compensating for angular misalignment or lateral displacement of the shafts and the longitudinal dimensions of the notches 26ᵈ and 36ᵈ are greater than the width of the retaining member 32 so that this member and the power transmitting members 31 may have some movement longitudinally of the shafts with respect to the coupling member 26. Since the jaws 25ª have no interlocking connection with the retaining member 32, the coupling member 25 and the shaft 27 are capable of an unlimited movement with respect to the coupling member 26 to accommodate relative endwise movement of the shafts during the rotation of the coupling.

In Fig. 10 of the drawings there is shown another modification of the invention in which the annular retaining member has no interlocking connection with the jaws of either coupling member or with the power transmitting members. In this form, a pair of coupling members 35 and 36 are secured upon a pair of substantially aligned shafts 37 and 38 by means of keys 39 and set screws, not illustrated. The coupling member 35 has a plurality of longitudinally extending lugs or jaws 35ª which are adapted to intermesh with a plurality of similar lugs or jaws 36ª carried by the other coupling member and the intermeshing lugs or jaws are spaced apart to receive between them a plurality of power transmitting members 41 which may be formed of rubber, leather, rubberized fabric, or combinations of these materials, as heretofore described, so that they are resilient and compressible and capable of being distorted to permit compensation for misalignment of the shafts. The outwardly extending faces of each power transmitting member 41 which contact with two jaws carried by opposite coupling members may converge inwardly or be parallel to each other, as previously described, and the inner ends 41ᶜ of these power transmitting members are adapted to engage the hub portions 35ᶜ and 36ᶜ of the coupling members. The power transmitting members 41 are held against radial outward movement by an annular retaining member 42 which is formed of several convolutions of the flat metal band having the ends secured together in the manner shown in Fig. 5. In this form, the band 42 is wider than the bands 22 and 32 previously described and occupies nearly the entire width of the outer ends of the members 41 with which the band contacts. The members 41 are of such length that the inner convolution of the member 42 is spaced outwardly from the outer surfaces 35ᵈ and 26ᵈ of the jaws carried by the coupling members 35 and 36, respectively, thus permitting some relative radial movement of the jaws with respect to the annular retaining member. In this form of construction, each coupling member 35 and 36 is capable of unlimited relative longitudinal movement away from the other coupling member and away from the intervening power transmitting members 41 but the outer faces of the jaws 35ª and 36ª are offset inwardly from the outer peripheral surfaces of the disks on which these jaws are formed so that all parts of the retaining member 42 lie within these peripheral surfaces and there is no danger of the retaining member contacting with surrounding objects during the rotation of the coupling.

In the form of the invention shown in Fig. 10, the annular retaining member 42 is made relatively wide, as compared with the width of the retaining members embodied in the forms of construction shown in Figs. 4 and 9, in order that this retaining member 42 will engage a relatively large portion of the outer end of each power transmitting member 41, even when the coupling members 35 and 36 are separated to the maximum extent, regardless of the position of the retaining member between the disks of the coupling members. The width of this retaining member 42 is, however, preferably less than the width of the power transmitting members 41 in order that the outer ends of the latter members may be visible around the periphery of the coupling to enable the attendant to determine the condition of these power transmitting members at any time during the life of the coupling. While retaining the advantage of the use of a flat band in the construction of the retaining member with a resulting large frictional resistance between adjacent convolutions, there is ordinarily an advantage in making the retaining member of considerably less width than the width of the power transmitting members, as shown in Figs. 4 and 9, since a comparatively narrow retaining member allows greater flexibility of the coupling in compensating for angular misalignment of the shafts. In any form of this invention, there is an important advantage gained with respect to the space which is necessary to permit access to the coupling for removing the annular retaining member and replacing any of the resilient power transmitting members. If the space through which access may be had to the coupling is only slightly greater than the width of the power transmitting members, the annular retaining member may be removed and the power transmitting members withdrawn even though all other parts of the coupling are enclosed by housings or parts of the machinery with which the two connected shafts are associated.

Although three forms of the invention have been shown and described by way of illustration, it will be understood that it may be constructed in various other embodiments coming within the scope of the appended claims.

I claim:

1. The combination in a coupling for connecting substantially aligned shafts, of a pair of coupling members each adapted to be secured upon one of said shafts, each of said coupling members having a plurality of longitudinally extending jaws adapted to intermesh loosely with the jaws carried by the other coupling member, a plurality of power transmitting members each interposed between two jaws carried by opposite coupling members, and an annular retaining member surrounding said power transmitting members and said jaws and comprising a plurality of radially superimposed convolutions of a flat band of metal, adjacent convolutions being in frictional contact with each other.

2. The combination in a coupling for connecting substantially aligned shafts, of a pair of coupling members each adapted to be secured upon one of said shafts, each of said coupling members having a plurality of longitudinally extending jaws adapted to intermesh loosely with the jaws carried by the other coupling member, a plurality of power transmitting members each interposed between two jaws carried by opposite coupling members, and an annular retaining member surrounding said power transmitting members and said jaws and comprising a plurality of radially superimposed convolutions of a flat metal band having its ends secured against relative radial displacement, adjacent convolutions of said band being in frictional contact with each other.

3. The combination in a coupling for connecting substantially aligned shafts, of a pair of coupling members each adapted to be secured upon one of said shafts, each of said coupling members having a plurality of longitudinally extending jaws adapted to intermesh loosely with the jaws carried by the other coupling member, a plurality of power transmitting members each interposed between two jaws carried by opposite coupling members, and an annular retaining member surrounding said jaws and engaging the outer ends of said power transmitting members, said retaining member being spaced from said jaws in a radial direction.

4. The combination in a coupling for connecting substantially aligned shafts, of a pair of coupling members each adapted to be secured upon one of said shafts, each of said coupling members having a plurality of longitudinally extending jaws adapted to intermesh loosely with the jaws carried by the other coupling member, a plurality of power transmitting members each interposed between two jaws carried by opposite coupling members, an annular retaining member surrounding said power transmitting members and said jaws, the outer ends of said power transmitting members being notched to receive said retaining member, said notches being of substantially greater width than said retaining member, and additional means for preventing radial inward displacement of said power transmitting members.

5. The combination in a coupling for connecting substantially aligned shafts, of a pair of coupling members each adapted to be secured upon one of said shafts, each of said coupling members having a plurality of longitudinally extending jaws adapted to intermesh loosely with the jaws carried by the other coupling member, a plurality of power transmitting members each interposed between two jaws carried by opposite coupling members, and an annular retaining member surrounding said power transmitting members and said jaws, the jaws of one of said coupling members and the outer ends of said power transmitting members being notched to receive said retaining member, the bottoms of the notches in said jaws being out of contact with said retaining member.

6. The combination in a coupling for connecting substantially aligned shafts, of a pair of coupling members each adapted to be secured upon one of said shafts, each of said coupling members having a plurality of longitudinally extending jaws adapted to intermesh loosely with the jaws carried by the other coupling member, a plurality of power transmitting members each interposed between two jaws carried by opposite coupling members, one of said coupling members having a hub engaged by the inner ends of said power transmitting members, and an annular retaining member surrounding said power transmitting members and said jaws, said retaining member being in contact with said power transmitting members and normally out of contact with said jaws and being composed of a plurality of radially superimposed convolutions of flat material which are not under radial pressure when there is no load on the coupling.

LOUIS RICEFIELD.